3,150,073
COMBINATION REFORMING AND
ISOMERIZATION PROCESS
Hugh P. Hebert and Ray J. Young, Maplewood, La., assignors to Cities Service Research and Development Company, New York, N.Y., a corporation of New Jersey
Filed Jan. 31, 1961, Ser. No. 86,171
12 Claims. (Cl. 208—79)

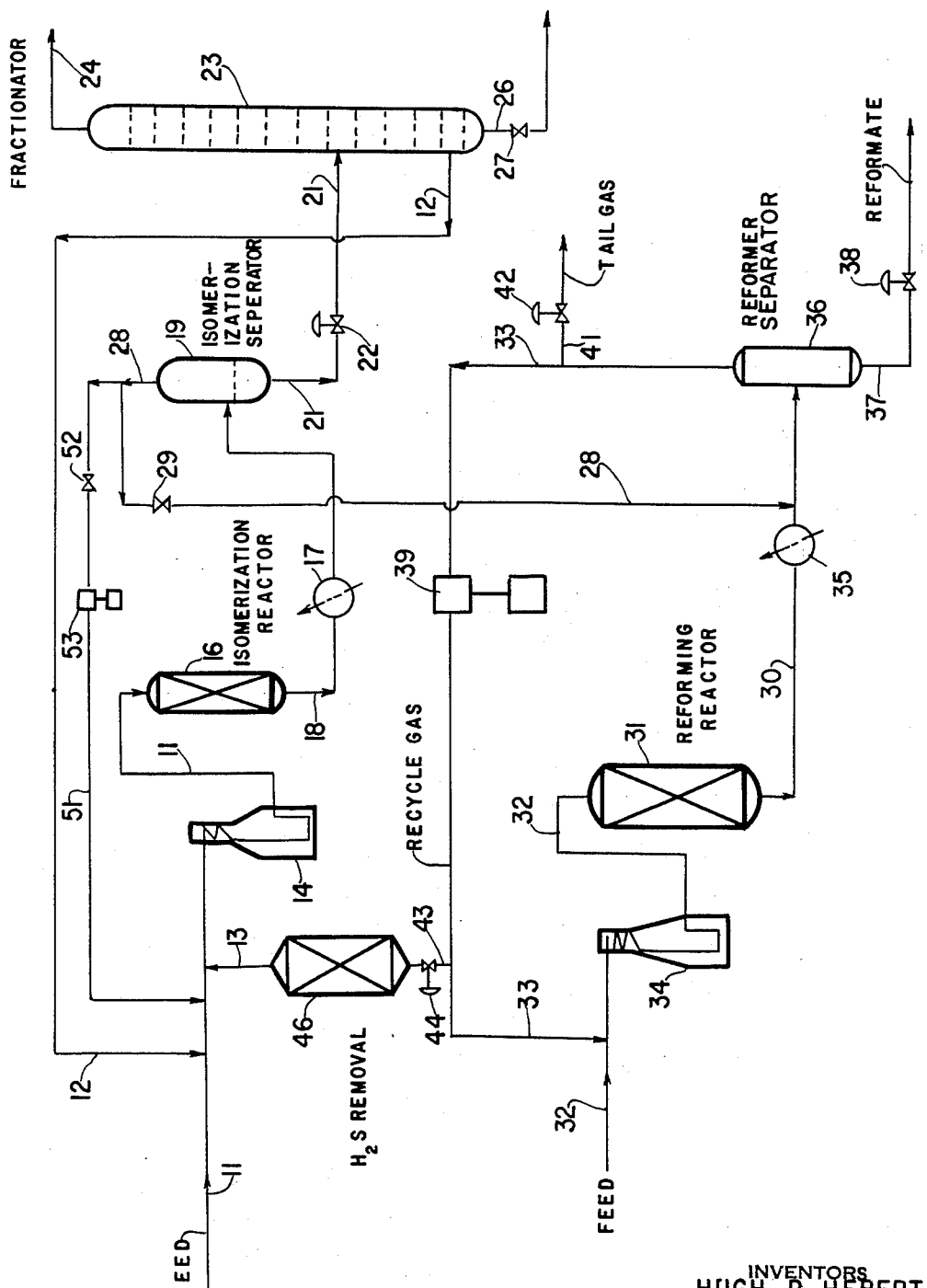

This invention relates to a process for the treatment of hydrocarbons and more particularly to the vapor phase isomerization of hydrocarbons in the presence of hydrogen and a solid isomerization catalyst.

In the vapor phase isomerization of hydrocarbons in the presence of hydrogen over a solid isomerization catalyst, the maximum yield of product isomer which is obtainable with any given operating conditions is limited by the equilibrium conditions of the reaction. For example, in the isomerization of normal pentane to isopentane under typical isomerizing conditions, the equilibrium ratio of isopentane to normal pentane in the reaction product is about 3 to 2 at 800° F. Thus, under these conditions, the reaction product contains a maximum of about 60 mole percent isopentane. While equilibrium ratios may vary widely depending upon the conversion conditions and isomerization reaction involved, the same equilibrium ratio of isomer product to unconverted feed prevails in the reaction zone effluent regardless of the ratios of these materials in the feed to the isomerization reaction. The maximum possible conversion of an isomerizable hydrocarbon to product isomer is therefore, reduced by the presence of product isomer in the feed stream.

The isomerization of hydrocarbons in the presence of hydrogen and a solid isomerization catalyst is usually carried out without consumption of any substantial amounts of hydrogen. Hydrogen is, therefore, usually supplied by recycling hydrogen separated from the isomerization reaction effluent. Unfortunately, due to the equilibrium conditions in the separator, the hydrogen separated from the reaction product normally contains substantial amounts of both unreacted hydrocarbon and product isomer. The product isomer present in this hydrogen recycle stream acts to reduce the conversion of feed to product isomer as described above. It is, therefore, highly desirable to reduce the concentration of product isomer in the hydrogen recycle stream to the isomerization reaction, since any reduction in the concentration of product isomer in this stream is accompanied by a corresponding increase in the conversion of feed to product isomer.

It is an object of the present invention to provide an improved process for the treatment of hydrocarbons.

It is another object of the invention to provide an improved process for the isomerization of normal paraffin hydrocarbons.

Another object of the invention is to provide an improved process for the isomerization of isomerizable hydrocarbons in the vapor state in the presence of hydrogen and a solid isomerization catalyst.

Yet another object of the present invention is to provide an improved process for the vapor phase isomerization of hydrocarbons in the presence of hydrogen and a solid isomerization catalyst in which a hydrogen recycle stream is employed and in which the concentration of product isomer in the hydrogen recycle stream is substantially reduced.

In accordance with a preferred embodiment of the present invention, an isomerizable hydrocarbon is contacted in the vapor phase with solid isomerization catalyst in the presence of hydrogen under suitable isomerization conditions and a gaseous hydrogen recycle stream is separated from the total product. This gaseous recycle stream, which contains significant amounts of product isomer, is commingled with the effluent from a conventional catalytic reforming reaction. A gaseous mixture containing hydrogen and substantially lower concentrations of product isomer than were contained in the gaseous stream separated from the isomerization effluent is then separated from the commingled mixture. A portion of this gaseous mixture is recycled to the isomerization reaction to provide hydrogen thereto while at least a portion of the remainder is recycled to the catalytic reforming reaction as a source of hydrogen.

When the hydrogen rich gaseous material separated from the isomerization reaction effluent and containing product isomer is commingled with the effluent from a catalytic reforming reaction as described above and a hydrogen rich recycle stream is separated from the commingled mixture, equilibrium conditions force a large portion of the product isomer into the liquid phase. This is due, at least in part, to the fact that reformer feed normally contains little, if any, of the hydrocarbon being utilized as isomerization feed. This is especially true in the use of the invention for the isomerization of normal paraffins. Consequently, the reformer effluent usually contains comparatively small proportions of product isomer. It is thus possible to separate from the commingled mixture a gaseous recycle mixture rich in hydrogen but containing a substantially lower concentration of product isomer than is present in the gaseous material separated from the isomerization effluent. For instance, in the isomerization of normal paraffins in accordance with the present invention, it is usually possible to reduce the concentration of product isomer in the hydrogen rich recycle stream to below about 1 mole percent, usually to below about 0.5 mole percent. Since this reduction in concentration of product isomer is due primarily to an equilibrium being established between the gaseous stream from the isomerization effluent and the unfractionated reforming effluent, the same advantage is not obtained by merely diluting the isomerization effluent gas with reformer recycle gas.

For a better understanding of the invention, reference should be had to the accompanying drawing which is a diagrammatic illustration in which equipment is shown in elevation of a suitable arrangement of apparatus for carrying out a preferred embodiment of the present invention.

In the drawing, feed for the isomerization reaction is introduced by suitable means such as a conduit 11. Recycle feed may be introduced through a conduit 12 and hydrogen rich recycle gas through a conduit 13. The feed mixture in conduit 11 may then be vaporized and heated to reaction temperature by suitable means such as a furnace 14 and passed to an isomerization reactor 16 in which it is contacted under suitable isomerization conditions with a solid isomerization catalyst.

The present invention is generally applicable to the isomerization of any isomerizable hydrocarbon. Hydrocarbons suitable for isomerization include for instance low normal boiling paraffin hydrocarbons, such as normal butane, normal pentane, normal hexane, etc., alkyl aliphatic cyclic hydrocarbons such as butyl cyclopentane, butyl cyclohexane, pentyl cyclohexane, etc., aliphatic cyclic hydrocarbons such as cyclopentane, cyclohexane, cycloheptane, etc., olefinic hydrocarbons such as butylenes, pentalenes, hexalenes, etc., and alkyl aromatic hydrocarbons such as butyl benzene, pentyl naphthalene, etc. All of the above classes of compounds except the aliphatic cyclic hydrocarbons contain a straight chain aliphatic group. Preferably this chain comprises an alkyl group although one or more of the hydrogen atoms of the alkyl group may be substituted with other radicals such as cycloalkyl radicals, halogen radicals, etc. While any isomerizable hydrocarbons, such as those listed above containing an aliphatic chain, may be isomerized in the practice of the present invention, particularly good results are obtained when the feed material comprises a normal paraffin hydrocarbon feed. Typical isomerization reactions with normal paraffins as starting materials include the isomerization of normal butane to isobutane and the isomerization of normal pentane and normal hexane to isopentane and isohexane. In these and other isomerization reactions, varying quantities of side products boiling both below and above the product isomers are frequently formed. The amounts and types of such side products are subject to variation depending on the type of hydrocarbon feed, reaction conditions and the particular isomerization catalyst used.

Isomerization feed materials such as those described above may be obtained from any suitable source. Normal paraffin feeds, for instance, are frequently obtained from refinery process streams, which are usually rich in normal paraffins, especially the lower boiling normal paraffins such as butane, pentane and hexane. Such refinery process streams include, for instance, straight run naphthas, straight run and cracked gasolenes and gases from crude distillation and cracking units. If desired, such streams may be processed to obtain higher concentrations of the desirable feed fractions. It is preferred because of the above mentioned equilibrium considerations to use a feedstock consisting essentially of normal paraffins and still more preferably of a single normal paraffin, e.g., butane, pentane or hexane.

As mentioned above, the isomerization reactor 16 is maintained under suitable isomerization conditions. These conditions vary widely depending upon the particular hydrocarbon being isomerized and while preferred operating conditions for low boiling straight chain hydrocarbon feeds are given below, it should be understood that the invention is not to be limited to these operating conditions, particularly if other isomerizable hydrocarbon feed is used. Isomerization of low boiling paraffin hydrocarbons is preferably carried out at temperatures between about 600 and about 950° F., more usually between about 750 and about 850° F. Generally speaking, the reaction rate is quite low at temperatures below about 750° F., while at temperatures substantially above 850° F., undesirable side reactions, accompanied by carbon deposition, frequently take place. The reaction pressure may be varied over a wide range, with pressures between about 100 and about 600 p.s.i.g. being preferred. Likewise, space velocities may vary considerably, such as between about 0.5 and about 10 lbs. of hydrocarbon feed per hour per pound of catalyst. Operation in the lower portion of this range is generally preferred since the degree of conversion normally decreases with increasing space velocity. The ratio of hydrogen to hydrocarbon in the isomerization reactor is preferably maintained between about 0.5 and about 5.0 moles of hydrogen per mole of hydrocarbon.

Even when pure normal paraffin feed is used, some side products are usually formed and some side reactions such as cracking take place. While these side reactions may consume small amounts of hydrogen, the amount of makeup hydrogen necessary is usually small, such as between about 10 and about 100 standard cubic feet per barrel of normal paraffin feed. In the operation of the present invention no makeup hydrogen is needed because the necessary makeup hydrogen is obtained from the reformer effluent as described below.

The catalyst with which the feed material from conduit 11 is contacted in the isomerization reactor 16 may be any suitable solid isomerization catalyst. Such catalysts include for instance those which are normally utilized in reforming reactions. While the reforming process involves a number of different hydrocarbon reactions including cracking, dehydrogenation, aromatization, hydrocracking, isomerization, cyclization, hydrogenation, etc., these catalysts are quite selective in the isomerization of isomerizable hydrocarbons, especially low boiling normal paraffins, in the presence of hydrogen. This selectivity for the isomerizing reaction is to the substantial exclusion of the other reforming reactions. It has also been found that partially deactivated reforming catalysts which have become unsuitable for reforming reactions due to frequent contamination and regeneration are still quite effective in promoting the isomerization reaction. It is, therefore, within the scope of the present invention to utilize either fresh or spent reforming catalyst or any other suitable solid isomerization catalyst in carrying out the isomerization reaction of the present invention.

Suitable catalysts for the isomerization reaction include, for instance, catalysts having between about 0.01 and about 10 weight percent, preferably between about 0.05 and about 1.5 weight percent, of platinum or palladium deposited on a cracking component such as silica-alumina, silica-magnesia, etc. Such catalyst may also contain a combined halogen, e.g., fluorine or chlorine, in amounts between about 0.1 and about 10 percent by weight. Another group of suitable catalysts comprises the oxides or sulfides of chromium, molybdenum or tungsten supported on alumina. Such catalysts usually contain only a small portion, such as between about 1 and about 10 weight percent, of the chromium, molybdenum or tungsten.

The above catalysts and other suitable catalyst may be prepared according to any conventional method of catalyst preparation. For example, platinum-alumina catalysts may be prepared by mixing alumina gel with a platinum salt and calcining at a high temperature. Halogen, usually in the form of an acid, may be added to the catalyst prior to calcining.

The catalyst in the isomerization reactor 16 may be in the form of a conventional fluid or fixed bed. When platinum or palladium catalyst is used, a fixed bed is usually preferred in order to minimize attrition losses of these catalysts.

Within the isomerization reactor 16, a portion of the hydrocarbon feed is converted to a mixture of product isomer and lower and higher boiling side products. The effluent from the reactor 16 is recovered as through a conduit 18 and passed to a high pressure separator 19 after cooling as in cooler 17. For convenience the high pressure separator 19 is normally operated at approximately the same pressure as the isomerization reactor 16. From the high pressure separator 19 a liquid product stream may be removed, as through a conduit 21 and valve 22, and passed to suitable fractionating equipment such as a fractionator 23. In the fractionator 23 the liquid from the separator 19 is fractionated into a product isomer stream which may be withdrawn overhead as through a conduit 24, a fraction of unreacted feed which may be withdrawn from the lower portion of the fractionator as through a conduit 12 and recycled as described above, and a stream of higher boiling product which may be withdrawn from the bottom of the fractionator as through a conduit 26 and valve 27.

Gaseous material rich in hydrogen which is separated from the isomerization reactor effluent in the separator 19 is withdrawn as through a conduit 28 and valve 29 and passed to a conduit 30 where it is commingled with the effluent from a catalytic reforming reactor 31.

Feed for the catalytic reforming reactor 31 may be introduced from a suitable source such as through a conduit 32. Such feed may comprise any suitable reforming feed, such as a naphtha fraction boiling between about 100 and about 400° F. The reformer feed preferably is essentially free of the particular hydrocarbon being utilized as isomerization feed so as to insure that the reformer effluent will contain a minimum of the hydrocarbon which is the product isomer of the isomerization reaction. Reformer feed in the conduit 32 is passed, together with recycled gas obtained from a conduit 33 as described below, through suitable heating means such as a furnace 34 to the reforming reactor 31. In the reforming reactor 31 the feed is contacted in the presence of the hydrogen-rich recycle gas with suitable reforming catalyst. Suitable reforming catalysts are, for instance, platinum or palladium catalysts on suitable supports such as those discussed above in connection with the isomerization reactor 16.

While the reforming reaction conditions may vary considerably, suitable reforming conditions include, for instance, temperatures between about 850 and about 1000° F., pressures between about 300 and about 700 p.s.i.g., space velocities between about 1 and about 10 lbs. of hydrocarbon per hour per pound of catalyst and hydrogen to hydrocarbon ratios between about 1 and about 10.

Effluent from the reforming reactor 31 may be withdrawn through the conduit 30 and passed through suitable cooling means such as a cooler 35 to a high pressure reformer separator 36. As mentioned above, the gaseous stream containing hydrogen and product isomer from the isomerization separator 19 should be commingled with at least a portion of the unfractionated reactor effluent prior to separation of a gaseous fraction therefrom. This may be accomplished by introducing the gaseous stream from the conduit 28 into the conduit 30 either before or after the material in the conduit 30 is cooled or by other suitable means, such as introducing the material from the conduit 28 into the separator 36 below the liquid level therein. The important factor is to insure that the gaseous material from the conduit 28 has an opportunity to establish equilibrium conditions with the effluent from the reforming reactor, prior to the separation of the relatively heavier hydrocarbons, e.g. $C_5$ and heavier, therefrom. Following the commingling of the gaseous material from the conduit 28 with the reformer effluent in the conduit 30 and the cooling of the reformer effluent to suitable temperatures, a gaseous, hydrogen rich recycle mixture is separated in the reforming separator 36 and may be withdrawn as through the conduit 33. The reformer separator 36 may be operated under any suitable conditions of temperature and pressure but is preferably operated at pressures approaching those maintained in the reforming reactor 31 for convenience in recycling the gaseous mixture through the conduit 33. Likewise, it is preferred that this pressure be approximately the same pressure maintained in the isomerization reactor 16 and the isomerization separator 19. While it is not essential to maintain similar pressures throughout the entire system, the use of such similar pressures greatly facilitates the various movements of gaseous streams without unnecessary compressor costs. The reformer separator 36, like the isomerization separator 19, may be maintained at a suitable temperature with temperatures between about 70 and about 100° F. being preferred.

Liquid reformate may be withdrawn from the lower portion of the reformer separator 36 through a conduit 37 and valve 38 while the gaseous mixture withdrawn through the conduit 33 is recycled by suitable means such as a recycle pump 39. Since the hydrogen consumed in the isomerization reactor is generally considerably less than that produced in the reforming reaction, a surplus of hydrogen builds up in the system which may be removed as desired through a conduit 41 and valve 42.

By allowing the product isomer-containing gaseous material from the isomerization separator 19 to come into equilibrium with unfractionated reformer effluent as described above, the gaseous mixture withdrawn from the reformer separator 36 through the conduit 33 contains substantially lower concentrations of product isomer than were present in the gaseous material passing through the conduit 28. A portion of this recycle gas containing little if any product isomer is recycled to the isomerization reactor 16 as though a conduit 43 and valve 44. Since this recycle stream frequently contains sulfur compounds, such as $H_2S$, which would be harmful to the isomerization reaction, the portion of the recycle gas passing through the conduit 43 is preferably treated for $H_2S$ removal as in an $H_2S$ removal unit 46. This $H_2S$ removal may be accomplished in any suitable manner such as by absorption. The recycle gas from the $H_2S$ removal unit 46 is then passed through conduit 13 and introduced into the feed in the conduit 11. This recycle gas supplies a source of hydrogen for the isomerization reaction without the adverse effect upon the isomerization conversion which would be caused by the presence of larger amounts of product isomer in the recycle hydrogen stream.

While the reforming reaction has been described and shown as a single stage reaction, it should be understood that conventional multistage reforming reactions may be employed so long as the final reforming effluent is commingled with the gaseous material withdrawn from the isomerization separator as described above.

In order to show the more conventional method of supplying recycle hydrogen to the isomerization reaction, a conduit 51 is shown which is capable of passing gaseous material from the reformer separator 19 through a valve 52 and recycle pump 53 to the conduit 11 for introduction into the isomerization reactor 16 along with the isomerization feed material. The conduit 51 is not used in practicing the present invention and is shown in the drawing merely to illustrate the conventional previously known method of supplying recycle hydrogen (see Example 2 below). Recycle hydrogen supplied through the conduit 51 contains excessive amounts of product isomer and brings about an extremely undesirable reduction in the conversion of feed to product isomer as compared with the use of recycle hydrogen supplied through the conduit 13 as described above and which is substantially free of product isomer.

EXAMPLE 1

*Operation in Accordance With the Present Invention*

The following example illustrates a practical application of the invention using the process and arrangement of apparatus described above.

In this example the feed to the isomerization reaction is normal pentane which enters through conduit 11 at the rate of 61.96 moles per hour. This pentane feed, together with recycle streams from conduits 12 and 13 having the compositions shown in Table I below, is passed through the furnace 14 where it is heated to a temperature slightly in excess of 800° F. and passes through the conduit 11 to the isomerization reactor 16 where it is contacted with an isomerization catalyst comprising 0.1 weight percent platinum on alumina. The isomerization reactor 16 is maintained at a temperature of 800° F., a pressure of 500 p.s.i.g., a weight space velocity of 3.2 lbs. of hydrocarbon per pound of catalyst per hour and a hydrogen to hydrocarbon ratio of 3 moles per mole. Under these conditions, the maximum possible conversion of pentane to isopentane allowed by equilibrium considerations is 60 percent based on pure pentane feed.

The effluent from the isomerization reactor 16 is passed through conduit 18 to the isomerization separator 19 which is maintained at a pressure of 500 p.s.i.g. and a temperature of 90° F. This reactor effluent has the composition shown in Table I below. From the separator 19 a gaseous fraction having the composition given in Table I below is withdrawn through the conduit 28 and valve 29 for commingling with reformer effluent as described above. Liquid having the composition given in Table I is withdrawn from the separator 19 through the conduit 21 and valve 22 and passed to the fractionator 23. A liquid fraction having the composition given in Table I below is withdrawn from the fractionator 23 through the conduit 12 and recycled to the conduit 11.

The reformer feed material for this example is naphtha feed introduced through the conduit 32 as described above and having the composition given in Table I below. This feed, together with recycle gas from the conduit 33, is passed through the heater 34 to the reforming reactor 31. In the reforming reactor 31 the reformer feed is contacted with reforming catalyst comprising 0.6 weight percent platinum on alumina at a temperature of 920° F., a pressure of 500 p.s.i.g., a weight space velocity of 2.8 and a hydrogen to hydrocarbon ratio of 7 moles per mole. Reformer effluent having the composition given in Table I below is withdrawn through conduit 29 and passed, together with the gaseous material from conduit 28, to the reformer separator 36 after being cooled by the cooler 35. The reformer separator 36 is maintained at a temperature of 90° F. and a pressure of 500 p.s.i.g. Liquid reformate having the composition given in Table I below is withdrawn through conduit 37 and valve 38 while recycle gas having the composition given in Table I below is withdrawn through conduit 33. As described above, a portion of this recycle gas is recycled to the reforming reaction through the conduit 33 while another portion is recycled to the isomerization reaction through the conduit 43, H₂S remover 46 and conduit 13.

When operating the apparatus in accordance with previously known techniques utilizing the same feed materials, the compositions of the various streams are given in Table II below, based on the same operating conditions mentioned above.

TABLE II

*Operation in Accordance With Prior Art*

| Mols per hour, present in— | Component | | | | | | | | |
|---|---|---|---|---|---|---|---|---|---|
| | $H_2$ | $C_1$ | $C_2$ | $C_3$ | $iC_4$ | $nC_4$ | $iC_5$ | $nC_5$ | $C_6^+$ |
| Isomerization feed (conduit 11) | | | | | | | | 53.55 | |
| Isomerization recycle liquid (conduit 12) | | | | | | | | 36.91 | |
| Isomerization recycle gas (conduit 51) | 298.51 | | | | | | 6.45 | 3.09 | |
| Isomerization reactor effluent (conduit 18) | 300.00 | | | | | | 60.0 | 40.0 | |
| Isomerization separator liquid (conduit 21) | 1.49 | | | | | | 53.55 | 36.91 | |

From Tables I and II it can be seen that the total $C_5$ hydrocarbon feed to the isomerization reactor is 100 moles per hour in both cases. Since equilibrium conditions limit conversion of normal pentane to isopentane product to 60 percent, the reactor effluent in both cases contains 60 moles per hour of isopentane and 40 moles per hour of normal pentane. The net effect of operation in accordance with the present invention is to transfer the vast majority of the $C_5$ hydrocarbons from the isomerization separator gas (withdrawn from the separator 19 through the conduit 28) to the reformer separator liquid by establishing equilibrium between the materials flowing through the conduits 28 and 30 as described above. By considering the quantity of $C_5$ hydrocarbons passing from the isomerization separator 19 through the conduit 28 and the quantity returned to the isomerization reaction through the conduit 13 and making allowance for the portion of $C_5$ hydrocarbons from the conduit 28 which are lost with the reformer

TABLE I

*Operation in Accordance With Present Invention*

| Mols per hour, present in— | Component | | | | | | | | |
|---|---|---|---|---|---|---|---|---|---|
| | $H_2$ | $C_1$ | $C_2$ | $C_3$ | $iC_4$ | $nC_4$ | $iC_5$ | $nC_5$ | $C_6^+$ |
| Isomerization feed (conduit 11) | | | | | | | | 61.96 | |
| Isomerization recycle liquid (conduit 12) | | | | | | | | 36.91 | |
| Isomerization recycle gas (conduit 13) | 300.00 | 25.69 | 14.16 | 9.54 | 1.89 | 1.76 | 0.75 | 0.38 | 0.21 |
| Isomerization reactor effluent (conduit 18) | 300.00 | 25.69 | 14.16 | 9.54 | 1.89 | 1.76 | 60.00 | 40.00 | 0.21 |
| Isomerization separator gas (conduit 28) | 298.51 | 24.16 | 10.90 | 4.86 | 0.60 | 0.41 | 6.45 | 3.09 | 0.0 |
| Isomerization separator liquid (conduit 21) | 1.49 | 1.53 | 3.26 | 4.68 | 1.29 | 1.35 | 53.55 | 36.91 | 0.21 |
| Reforming feed (conduit 32) | | | | | | | | | 383.5 |
| Reforming reactor effluent (conduit 30) | 2,625.0 | 232.7 | 144.4 | 126.5 | 34.7 | 41.4 | 27.0 | 19.8 | 291.9 |
| Reforming recycle gas (conduit 33) | 2,266.8 | 195.8 | 109.2 | 75.0 | 14.9 | 13.9 | 4.7 | 2.6 | 1.6 |
| Reforming separator liquid (conduit 37) | 6.30 | 6.89 | 17.87 | 38.79 | 16.98 | 24.67 | 26.18 | 19.15 | 289.88 |
| Reforming tail gas (conduit 41) | 344.9 | 29.53 | 16.31 | 10.96 | 2.16 | 2.03 | 0.86 | 0.43 | 0.23 |

EXAMPLE 2

*Operation in Accordance With Prior Art*

In order to demonstrate the advantages of the present invention, the apparatus shown in the drawing may be operated in accordance with previously known techniques rather than in accordance with the present invention. This is accomplished by recycling gas from the isomerization separator directly to the isomerization reaction without bringing the same into equilibrium with reformer effluent. In order to operate the equipment in this manner, valve 52 is opened and valves 29 and 44 are closed so that the reformer recycle gas is not passed to the isomerization zone and isomerization recycle gas is obtained directly from the isomerization separator in accordance with previously known methods of operation. The small amounts of makeup hydrogen required for the isomerization reaction when operating according to these techniques may be obtained from the reformer recycle gas or from a fresh supply of hydrogen from any other source.

tail gas through the conduit 41, the liquid passing from the reformer separator 36 through the conduit 37 is found to be enriched by 5.9 moles per hour of isopentane and 2.51 moles per hour of normal pentane. The total conversion of pentane to isopentane has, therefore, been increased approximately 10 percent, based on the capacity of the isomerization unit when operated according to previously known methods. The additional isopentane present in the liquid reformate when operating in accordance with the invention may, of course, be separated or used in any suitable manner, such as for blending high octane gasolene, together with the isopentane normally present in such reformate.

While the invention has been described above in connection with a preferred embodiment thereof, it will be understood by those skilled in the art that various changes and modifications may be made without departing from the spirit and scope of the invention and it is intended to cover all such changes and modifications in the appended claims.

We claim:

1. The process for the isomerization of hydrocarbons which comprises contacting an isomerizable hydrocarbon in the vapor state in the presence of hydrogen in an isomerization zone with a solid isomerization catalyst under suitable isomerization conversion conditions, separating from the isomerization zone effluent a gaseous material containing hydrogen and product isomer, said gaseous material containing a substantially lower concentration of product isomer than is present in the remainder of the reaction zone effluent, then commingling said gaseous material with effluent from a hydrocarbon reforming reaction zone, then separating from the thus commingled material a gaseous mixture containing a substantially lower concentration of said product isomer than is present in the gaseous material separated from the isomerization zone effluent, and then recycling at least a portion of said gaseous mixture to the isomerization zone.

2. The process for the isomerization of hydrocarbons which comprises contacting a normal paraffin hydrocarbon in the vapor state in the presence of hydrogen in an isomerization zone with a solid isomerization catalyst under suitable isomerization conversion conditions, separating from the isomerization zone effluent a gaseous material containing hydrogen and product isomer, said gaseous material containing a substantially lower concentration of product isomer than is present in the remainder of the reaction zone effluent, then commingling said gaseous material with unfractionated effluent from a hydrocarbon reforming reaction zone, then separating from the thus commingled material a gaseous mixture containing a substantially lower concentration of said product isomer than is present in the gaseous material separated from the isomerization zone effluent, and then recycling at least a portion of said gaseous mixture to the isomerization zone.

3. The process for the isomerization of hydrocarbons which comprises contacting an isomerizable hydrocarbon in the vapor state in the presence of hydrogen in an isomerization zone with a solid isomerization catalyst under suitable isomerization conversion conditions, separating from the isomerization zone effluent a gaseous material containing hydrogen and product isomer, said gaseous material containing a substantially lower concentration of product isomer than is present in the remainder of the reaction zone effluent, then commingling said gaseous material with unfractionated effluent from a hydrocarbon reforming reaction zone, then separating from the thus commingled material a gaseous mixture containing hydrogen and less than about 1 mole percent of said product isomer, and then recycling at least a portion of said gaseous mixture to the isomerization zone.

4. The process for the treatment of hydrocarbons which comprises contacting an isomerizable hydrocarbon in the vapor state with a solid isomerization catalyst in the presence of hydrogen in an isomerization zone under suitable isomerization conversion conditions, contacting a suitable hydrocarbon reforming feed with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with effluent from said reforming zone, then separating from the thus commingled material a gaseous mixture containing hydrogen and having a substantially lower concentration of said product isomer than is present in the gaseous material separated from the isomerization zone effluent, recycling a portion of said gaseous mixture to the isomerization zone and recycling at least a portion of the remainder of said gaseous mixture to the reforming zone.

5. The process for the treatment of hydrocarbons which comprises contacting an isomerizable hydrocarbon in the vapor state with a solid isomerization catalyst in the presence of hydrogen in an isomerization zone under suitable isomerization conversion conditions, contacting a suitable hydrocarbon reforming feed with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with unfractionated effluent from said reforming zone, then separating from the thus commingled material a gaseous mixture containing hydrogen and having a substantially lower concentration of said product isomer than is present in the gaseous material separated from the isomerization zone effluent, recycling a portion of said gaseous mixture to the isomerization zone and recycling at least a portion of the remainder of said gaseous mixture to the reforming zone.

6. The process for the treatment of hydrocarbons which comprises contacting a normal paraffin hydrocarbon in the vapor state with a solid isomerization catalyst in the presence of hydrogen in an isomerization zone under suitable isomerization conversion conditions, contacting a suitable hydrocarbon reforming feed with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with effluent from said reforming zone, then separating from the thus commingled material a gaseous mixture containing hydrogen and having a substantially lower concentration of said product isomer than is present in the gaseous material separated from the isomerization zone effluent, recycling a portion of said gaseous mixture to the isomerization zone and recycling at least a portion of the remainder of said gaseous mixture to the reforming zone.

7. The process for the treatment of hydrocarbons which comprises contacting a normal paraffin hydrocarbon in the vapor state with a solid isomerization catalyst in the presence of hydrogen in an isomerization zone under suitable isomerization conversion conditions, contacting a suitable hydrocarbon reforming feed with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with unfractionated effluent from said reforming zone, then separating from the thus commingled material a gaseous mixture containing hydrogen and having a substantially lower concentration of said product isomer than is present in the gaseous material separated from the isomerization zone effluent, recycling a portion of said gaseous mixture to the isomerization zone and recycling at least a portion of the remainder of said gaseous mixture to the reforming zone.

8. The process for the treatment of hydrocarbons which comprises contacting an isomerizable hydrocarbon in the vapor state with a solid isomerization catalyst in the presence of hydrogen in an isomerization zone under suitable isomerization conditions, contacting a suitable hydrocarbon reforming feed with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with effluent from said reforming zone, then separating from the thus commingled material a gaseous mixture containing hydrogen and less than about 1 mole percent of said product isomer, recycling a portion of said gaseous mixture to the isomerization zone and recycling at least a portion of the remainder of said gaseous mixture to the reforming zone.

9. The process for the treatment of hydrocarbons which comprises contacting an isomerizable hydrocarbon in the vapor state with a solid isomerization catalyst in the presence of hydrogen in an isomerization zone under suitable isomerization conditions, contacting a suitable hydrocarbon reforming feed essentially free of said isomerizable hydrocarbon with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with effluent from said reforming zone, then separating from the thus commingled material a gaseous mixture containing hydrogen and less than about 1 mole percent of said product isomer, recycling a portion of said gaseous mixture to the isomerization zone and recycling at least a portion of the remainder of said gaseous mixture to the reforming zone.

10. The process for the treatment of hydrocarbons which comprises contacting a normal paraffin hydrocarbon having from 4 to 6 carbon atoms in the vapor state with a solid isomerization catalyst in the presence of hydrogen in an isomerization zone under suitable isomerization conditions, contacting a suitable hydrocarbon reforming feed essentially free of said normal paraffin hydrocarbon with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with unfractioned effluent from said reforming zone, then separating from the thus commingled material a gaseous mixture containing hydrogen and less than about 1 mole percent of said product isomer, recycling a portion of said gaseous mixture to the isomerization zone and recycling at least a portion of the remainder of said gaseous mixture to the reforming zone.

11. The process for the treatment of hydrocarbons which comprises contacting an isomerizable hydrocarbon in the vapor state with a solid isomerization catalyst in the presence of hydrogen in an isomerization zone under suitable isomerization conversion conditions, contacting a suitable hydrocarbon reforming feed with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with effluent from said reforming zone, then separating from the thus commingled material a gaseous mixture containing hydrogen and having a substantially lower concentration of said product isomer than is present in the gaseous material separated from the isomerization zone effluent and recycling at least a portion of said gaseous mixture to the isomerization zone.

12. A process for the treatment of hydrocarbons which comprises contacting a normal paraffin hydrocarbon having from 4 to 6 carbon atoms in the vapor state with a solid isomerization catalyst in the presence of hydrogen in an isomerization zone under suitable isomerization conversion conditions, contacting a suitable reforming feed substantially free of said normal paraffin hydrocarbon with reforming catalyst in a reforming zone under suitable reforming conditions, separating from the isomerization zone effluent a gaseous material containing hydrogen and product isomer, said gaseous material containing a substantially lower concentration of product isomer than is present in the remainder of the reaction zone effluent, then commingling said gaseous material with unfractionated effluent from the reforming zone, then separating from the thus commingled material a gaseous mixture containing hydrogen and having a substantially lower concentration of said product isomer than is present in the gaseous material separated from the isomerization zone effluent and recycling at least a portion of said gaseous mixture to the isomerization zone.

References Cited in the file of this patent

UNITED STATES PATENTS

| | | |
|---|---|---|
| 2,356,019 | Ward | Aug. 15, 1944 |
| 2,651,597 | Corner et al. | Sept. 8, 1953 |
| 2,659,692 | Haensel et al. | Nov. 17, 1953 |
| 2,773,809 | Haensel et al. | Dec. 11, 1956 |
| 2,866,745 | Heinemann et al. | Dec. 30, 1958 |
| 3,018,244 | Stanford et al. | Jan. 23, 1962 |